US009538095B2

(12) United States Patent
Suda et al.

(10) Patent No.: US 9,538,095 B2
(45) Date of Patent: Jan. 3, 2017

(54) IMAGING DEVICE FOR WELDING

(71) Applicant: MITSUBISHI HEAVY INDUSTRIES, LTD., Tokyo (JP)

(72) Inventors: Naoki Suda, Tokyo (JP); Tomoaki Wakayama, Tokyo (JP); Motohiro Itotani, Tokyo (JP); Hiroshi Yatabe, Hiroshima (JP); Shin-ichi Imayoshi, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 278 days.

(21) Appl. No.: 14/387,308

(22) PCT Filed: Mar. 25, 2013

(86) PCT No.: PCT/JP2013/058509
§ 371 (c)(1),
(2) Date: Sep. 23, 2014

(87) PCT Pub. No.: WO2013/146643
PCT Pub. Date: Oct. 3, 2013

(65) Prior Publication Data
US 2015/0062327 A1 Mar. 5, 2015

(30) Foreign Application Priority Data
Mar. 28, 2012 (JP) ................. 2012-072706

(51) Int. Cl.
*H04N 9/47* (2006.01)
*H04N 5/243* (2006.01)
(Continued)

(52) U.S. Cl.
CPC .............. *H04N 5/243* (2013.01); *B23K 9/32* (2013.01); *B23K 26/032* (2013.01);
(Continued)

(58) Field of Classification Search
IPC ...................................................... H04N 5/243
See application file for complete search history.

(56) References Cited

U.S. PATENT DOCUMENTS

2004/0124227 A1 7/2004 Seki et al.
2004/0232813 A1* 11/2004 Nakano ............ G02B 5/22
                                                    313/112
(Continued)

FOREIGN PATENT DOCUMENTS

JP 58-043188 A 3/1983
JP 63-130272 A 6/1988
(Continued)

OTHER PUBLICATIONS

International Search Report (Form PCT/ISA/210) dated May 28, 2013, issued in corresponding International Application No. PCT/JP2013/058509, with Form PCT/ISA/220 and Written Opinion (Form PCT/ISA/237) (13 pages).
(Continued)

*Primary Examiner* — Tracy Y Li
(74) *Attorney, Agent, or Firm* — Westerman, Hattori, Daniels & Adrian, LLP

(57) ABSTRACT

A welding camera (1) is constructed with: a lens (11) for focusing incident light; an optical filter (12) that comprises a neutral density filter for reducing the amount of the incident light, an ultraviolet cut filter for cutting ultraviolet rays, and a green band-pass filter for transmitting green light; a CMOS imaging unit (13) that has a wide dynamic range function, and detects the light which has passed the optical filter (12); a video signal processing unit (14) that has an automatic gain control function and a digital signal processor, and outputs an image signal, which covers a range of a low-intensity dark part to high-intensity arc light, to a
(Continued)

display unit on the basis of an electric signal that is input from the CMOS imaging unit (13).

4 Claims, 3 Drawing Sheets

(51) Int. Cl.
    *G01B 11/24*     (2006.01)
    *G03B 11/00*     (2006.01)
    *G02B 5/20*     (2006.01)
    *H04N 5/225*     (2006.01)
    *B23K 9/32*     (2006.01)
    *B23K 31/12*     (2006.01)
    *B23K 26/03*     (2006.01)
    *H04N 5/355*     (2011.01)
    *H04N 7/18*     (2006.01)
    *G02B 5/22*     (2006.01)

(52) U.S. Cl.
    CPC ............ *B23K 31/125* (2013.01); *G01B 11/24* (2013.01); *G02B 5/205* (2013.01); *G03B 11/00* (2013.01); *H04N 5/2254* (2013.01); *H04N 5/355* (2013.01); *H04N 7/183* (2013.01); *G02B 5/226* (2013.01); *H04N 2005/2255* (2013.01)

(56) References Cited

U.S. PATENT DOCUMENTS

2006/0215908 A1* 9/2006 Kamon ................ H04N 1/6088
    382/167
2008/0037976 A1* 2/2008 Funaki .................. G03B 13/18
    396/108
2009/0027518 A1* 1/2009 Kita ........................ G02B 5/284
    348/231.99
2009/0047010 A1* 2/2009 Yoshida .................. G02B 7/36
    396/127
2009/0213244 A1* 8/2009 Seo ........................ H04N 5/235
    348/230.1
2009/0316240 A1* 12/2009 Hara .................... G11B 7/0065
    359/33
2011/0285881 A1* 11/2011 Izuha .................... H04N 5/2254
    348/279
2012/0162494 A1* 6/2012 Nakamura ......... H04N 5/23212
    348/345

FOREIGN PATENT DOCUMENTS

| JP | 2001-259883 A | 9/2001 |
| JP | 2004-66267 A | 3/2004 |
| JP | 2006-119454 A | 5/2006 |
| JP | 2009-220172 A | 10/2009 |
| JP | 4501101 B2 | 4/2010 |
| WO | 02/064304 A1 | 8/2002 |

OTHER PUBLICATIONS

Notification of Transmittal of Translation of the International Preliminary Report on Patentability (Chapter I or Chapter II) (Form PCT/IB/338) of the International Application No. PCT/JP2013/058509 mailed Oct. 9, 2014 with forms PCT/IB/373 and PCT/ISA/237 (10 pages).

* cited by examiner

IMAGING DEVICE FOR WELDING

TECHNICAL FIELD

The present invention relates to an imaging device for welding applied to automatic welding.

BACKGROUND ART

Conventionally, as a monitoring apparatus using an imaging device for capturing an image of a welding portion, an apparatus has been publicly known in which the dynamic range of the imaging device is increased to allow the imaging device to accurately capture an image of a wide luminance range from a high-luminance portion near molten metal to a portion on the periphery of the welding portion when capturing an image of the welding portion and its periphery in arc welding, thereby displaying a high-definition image in which the molten metal and its periphery having a high luminance and a dark portion having a low luminance are both clearly shown (see, for example, Patent Document 1).

PRIOR ART DOCUMENT

Patent Document

Patent Document 1: Japanese Patent Application Publication No. 2001-259883

SUMMARY OF THE INVENTION

Problems to be Solved by the Invention

However, the state of the welding portion (a molten pool, an electrode, and a peripheral bead) in welding cannot be clearly observed in some cases only by increasing the dynamic range of the imaging device as in the conventional monitoring apparatus described above. Hence, the conventional technique has a problem that welding by remote control is difficult and it is limited where the automatic welding can be applied.

In view of this, an object of the present invention is to provide an imaging device for welding by which the state of the welding portion in welding can be clearly observed.

Means for Solving the Problems

An imaging device for welding of a first aspect of the present invention for solving the problem described above is characterized in that the imaging device comprises: a lens configured to focus incident light; an optical filter configured to transmit a predetermined amount of light having a predetermined wavelength in the light focused by the lens; a CMOS imaging unit configured to sense the light focused by the lens and transmitted through the optical filter and convert the thus-sensed light into an electric signal, the CMOS imaging unit having a wide dynamic range function capable of sensing a range of light from a dark portion having a low luminance to ark light having a high luminance; and a video signal processing unit configured to process the electric signal inputted from the CMOS imaging unit and output the processed electric signal to a display unit, the video signal processing unit having an automatic gain control function capable of performing control of equalizing a brightness difference in a captured video and including a digital signal processor capable of performing calculation processing for equalizing the brightness difference at high speed, and the optical filter includes a neutral density filter configured to reduce an amount of the incident light, an ultraviolet filter configured to block ultraviolet light, and a blue-green bandpass filter configured to transmit blue-green light.

Moreover, an imaging device for welding of a second aspect of the present invention for solving the problem described above is the imaging device for welding of the first aspect characterized in that a transmittance of the neutral density filter is 10% to 80%.

Furthermore, an imaging device for welding of a third aspect of the present invention for solving the problem described above is the imaging device for welding of the second aspect characterized in that the transmittance of the neutral density filter is 30% to 50%.

Moreover, an imaging device for welding of a fourth aspect of the present invention for solving the problem described above is the imaging device for welding of the third aspect characterized in that the transmittance of the neutral density filter is 42%.

Effect of the Invention

The imaging device for welding of the present invention described above makes it possible to surely and clearly observe a state of welding in welding. This facilitates remote control for automatic welding and increases the number of portions where the automatic welding can be performed. Hence, the man-hour can be reduced by saving labor.

MODE FOR CARRYING OUT THE INVENTION

An imaging device for welding of the present invention is described below in detail with reference to the drawings.

Embodiment

A first embodiment of the imaging device for welding of the present invention is described by using FIGS. 1 to 4.

Figure 1:
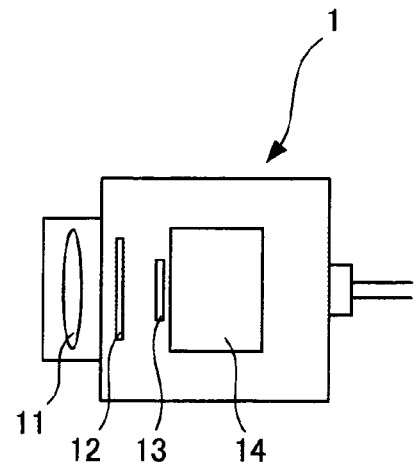
FIG. 1 is an explanatory view showing a configuration of an imaging device for welding in an embodiment of the present invention.

As shown in FIG. 1, a welding camera 1 which is the imaging device for welding in the embodiment is configured to include a lens 11, an optical filter 12, a welding camera CMOS (Complementary Metal Oxide Semiconductor) imaging unit 13, and a video signal processing unit 14.

The lens 11 is a lens configured to focus a captured image on the CMOS imaging unit 13.

The optical filter 12 is a filter which transmits only a certain amount of visible light in a certain wavelength band which is required, out of incident light. In the embodiment, the optical filter 12 is formed by overlapping three types of filters including a neutral density (ND) filter, an ultraviolet (UV) filter, and a blue-green bandpass (BG) filter or by combining these filters into one filter.

The neutral density filter is a filter which reduces the amount of light entering the CMOS imaging unit 13. In the embodiment, a filter with transmittance of about 10% to about 80%, preferably about 30% to about 50%, most preferably about 42% is used as the neutral density filter. The ultraviolet filter is a filter which blocks ultraviolet light and prevents it from entering the CMOS imaging unit 13. The blue-green bandpass filter is a filter which transmits light in a range from blue light to green light and allows it to enter the CMOS imaging unit 13. An example of the blue-green bandpass filter includes BG39 filter made by SCHOT AG.

Figure 2:
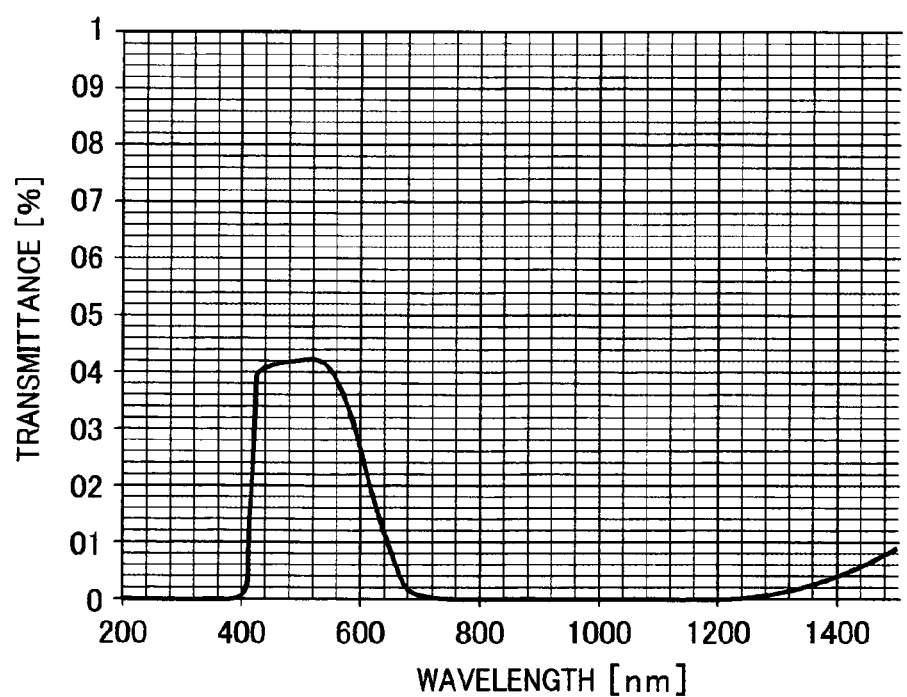
FIG. 2 is a graph showing characteristics of an optical filter of the imaging device for welding in the embodiment of the present invention.

The optical filter 12 configured as described above transmits part (10% to 80%, about 42% at maximum in FIG. 2) of light in a wavelength range of about 410 nm to about 670 nm as shown in FIG. 2.

The CMOS imaging unit 13 has a sensitivity high enough to be used even in a low luminance situation and has a wide dynamic range wide enough to capture an image of a high luminance portion. The CMOS imaging unit 13 senses a range of light from the shapes of a molten pool and a weld bead to arc light having a high luminance, and converts these into electric signals.

The video signal processing unit 14 includes a digital signal processor (DSP) capable of performing specific calculation processing at high speed and has an automatic gain control (AGC) function capable of performing control of equalizing a brightness difference in the captured video. The video signal processing unit 14 performs calculation processing on the electric signals inputted from the CMOS imaging unit 13, the calculation processing performed to clearly display, on one screen, an image in a later-described metering area 9a set in the center of the screen, from a low luminance portion to a high luminance portion.

The imaging device for welding of the embodiment having the configuration described above makes it possible to clearly display the shape of the arc light having a high luminance and the shapes of subjects such as the molten pool and the weld bead having a low luminance on one screen, and appropriately monitor the arc light and these subjects.

An example in which the welding camera 1 is used for remote control for automatic welding in the embodiment is described below by using FIGS. 3 and 4.

Figure 3:
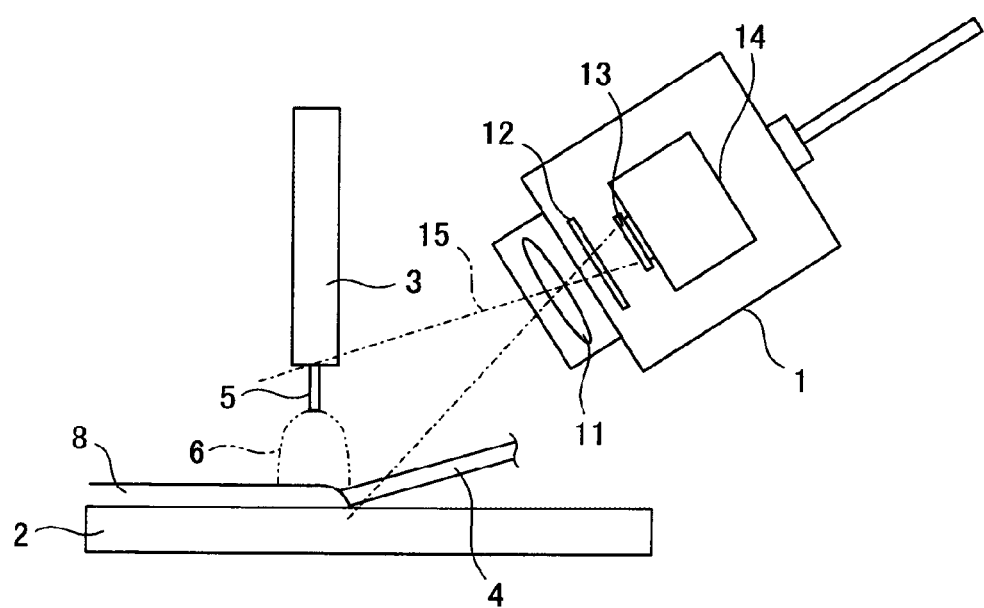
FIG. 3 is an explanatory view showing a positional relationship between a welding camera and a welding portion in welding in the embodiment of the present invention.
Figure 4:
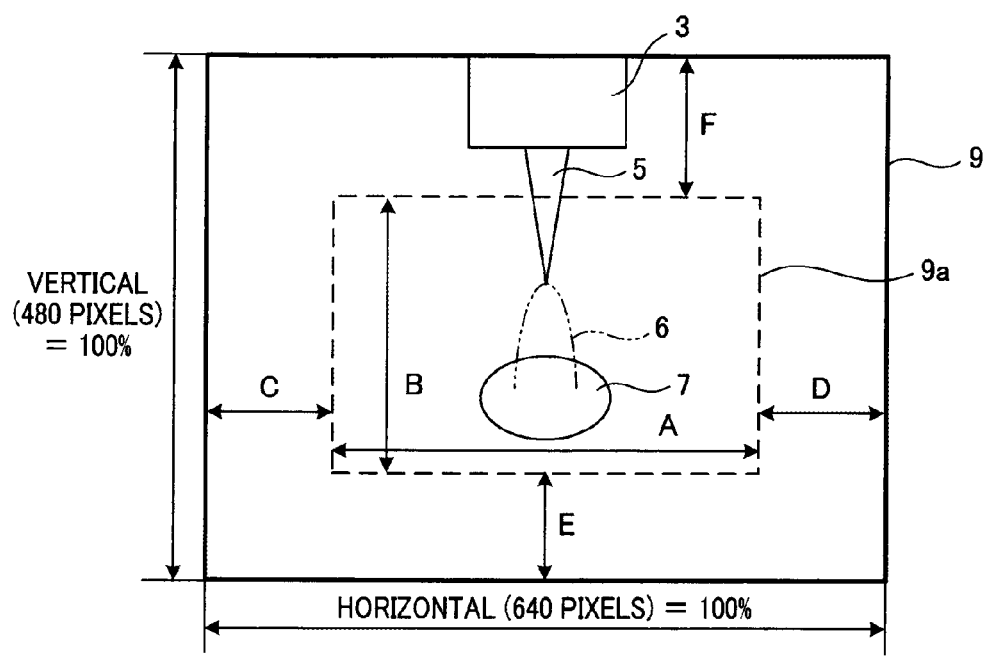
FIG. 4 is a view for explaining an example of an image captured by the imaging device for welding in the embodiment of the present invention.

As shown in FIGS. 3 and 4, when a steel material 2 and another steel material are joined by arc welding or arc welding is performed to repair the steel material 2 in automatic welding, a filler material 4 is inserted into a portion where the welding is to be performed while a welding torch 3 is moved along a movement direction (a direction from left to right in FIG. 2), and an arc 6 is generated between the steel material 2 and an electrode 5 of the welding torch 3 to melt the filler material 4 and perform the welding.

At this time, the arc 6 generated between the steel material 2 and the electrode 5 of the welding torch 3 generates arc light having a high luminance. In addition, a molten pool 7 is formed in the welding portion by the melting of the filler material 4 and a weld bead 8 is formed in a portion where the welding is completed.

The distance between such a welding portion and the welding camera 1 is set such that the welding camera 1 can monitor the arc light, the molten pool 7, and the weld bead 8 in the welding portion and these subjects are in the field of view 15 of the welding camera 1 (for example, 150 mm to 200 mm).

Moreover, as shown in FIG. 4, the metering area 9a is set in the center of a screen 9 as a region in which the brightness difference between the arc light and the amount of light in a peripheral portion is equalized by the automatic gain control function. In the embodiment, the metering area 9a has such a rectangular shape that the number of pixels in a horizontal direction is A and the number of pixels in a vertical direction is B. For example, in the embodiment, provided that the sizes of the screen 9 in the horizontal direction and the vertical direction are 640 pixels and 480 pixels, respectively, and these sizes are each taken as 100%, the number of pixels A of the metering area 9a in the horizontal direction is set to 60% (384 pixels) the size of the screen 9 in the horizontal direction and the number of pixels B of the metering area 9a in the vertical direction is set to 50% (240 pixels) the size of the screen 9 in the vertical direction. Note that, C and D in the drawing are 20% the size of screen 9 while E and F in the drawing are 20% and 30% the size of screen 9, respectively.

In the imaging device for welding of the embodiment configured as described above, the visibility of the imaging device for welding in the monitoring can be greatly improved such that the state of the welding portion including the arc light, the molten pool, the weld bead, and the like can be clearly observed in the automatic welding. This facilitates welding by remote control and can increase the number of portions where automatic welding can be performed. Hence, the man-hour can be reduced by saving labor.

Note that the range of the metering area 9a is not limited to that described in the aforementioned embodiment, and may be any range in which the arc light is in at least the metering area 9a and which is appropriate for equalizing the brightness difference between the arc light and the amount of light in the peripheral area.

INDUSTRIAL APPLICABILITY

The present invention is preferably applied to an imaging device for welding used for automatic welding.

EXPLANATION OF THE REFERENCE NUMERAL

1 Imaging device for welding
2 Steel material
3 Welding torch
4 Filler material
5 Electrode
6 Arc light
7 Molten pool
8 Weld bead
9 Screen
9a Metering area
11 Lens of imaging device for welding
12 Optical filter
13 CMOS imaging unit of imaging device for welding
14 Video signal processing unit of imaging device for welding
15 Field of view of camera

The invention claimed is:
1. An imaging device for welding characterized in that the imaging device comprises:
 a lens configured to focus incident light;
 an optical filter configured to transmit a predetermined amount of light having a predetermined wavelength in the light focused by the lens;

a CMOS (Complementary Metal Oxide Semiconductor) imaging unit configured to sense the light focused by the lens and transmitted through the optical filter and convert the thus-sensed light into an electric signal, the CMOS imaging unit having a wide dynamic range function capable of sensing a range of light from a dark portion having a low luminance to ark light having a high luminance; and a video signal processing unit configured to process the electric signal inputted from the CMOS imaging unit and output the processed electric signal to a display unit, the video signal processing unit having an automatic gain control function capable of performing control of equalizing a brightness difference in a captured video and including a digital signal processor capable of performing calculation processing for equalizing the brightness difference at high speed, and the optical filter includes a neutral density filter configured to reduce an amount of the incident light, an ultraviolet filter configured to block ultraviolet light, and a blue-green bandpass filter configured to transmit blue-green light.

2. The imaging device for welding according to claim 1, characterized in that a transmittance of the neutral density filter is 10% to 80%.

3. The imaging device for welding according to claim 2, characterized in that the transmittance of the neutral density filter is 30% to 50%.

4. The imaging device for welding according to claim 3, characterized in that the transmittance of the neutral density filter is 42%.

* * * * *